United States Patent
Caulfield et al.

(10) Patent No.: US 10,341,454 B2
(45) Date of Patent: Jul. 2, 2019

(54) VIDEO AND MEDIA CONTENT DELIVERY NETWORK STORAGE IN ELASTIC CLOUDS

(71) Applicant: Cisco Technology, Inc., San Jose, CA (US)

(72) Inventors: Matthew Francis Caulfield, Harvard, MA (US); Eric Colin Friedrich, North Easton, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 343 days.

(21) Appl. No.: 15/345,830

(22) Filed: Nov. 8, 2016

(65) Prior Publication Data
US 2018/0131783 A1    May 10, 2018

(51) Int. Cl.
*H04L 29/08*    (2006.01)

(52) U.S. Cl.
CPC .......... *H04L 67/2842* (2013.01); *H04L 67/10* (2013.01)

(58) Field of Classification Search
CPC ............................ H04L 67/2842; H04L 67/10
See application file for complete search history.

(56) References Cited

U.S. PATENT DOCUMENTS

| | | | |
|---|---|---|---|
| 8,812,695 B2 | 8/2014 | Luna et al. | |
| 8,825,830 B2 | 9/2014 | Newton et al. | |
| 9,015,212 B2 | 4/2015 | David et al. | |
| 9,015,348 B2 | 4/2015 | Hofmann et al. | |
| 9,386,116 B2 | 7/2016 | Li et al. | |
| 2009/0198790 A1* | 8/2009 | Grevers, Jr. | ........ H04L 67/2842 709/213 |
| 2017/0168958 A1* | 6/2017 | van Greunen | .......... G06F 12/12 |
| 2017/0171114 A1* | 6/2017 | Dao | ..................... H04L 67/2842 |

* cited by examiner

*Primary Examiner* — Chris Parry
*Assistant Examiner* — Caroline H Jahnige
(74) *Attorney, Agent, or Firm* — Merchant & Gould P.C.

(57) ABSTRACT

Content delivery network storage may be provided. A first proxy module may receive a first content object request from a first user device. The first content object request may correspond to a content object. Next, the first proxy module may send the first content object request to a first cache module. The first cache module may then obtain the content object corresponding to the first content object request from an object store. The object store may be shared by a plurality of cache modules including the first cache module. The first proxy module may then receive, from the first cache module, the obtained content object. The first proxy module may send the content object to the first user device.

13 Claims, 4 Drawing Sheets

VIDEO AND MEDIA CONTENT DELIVERY NETWORK STORAGE IN ELASTIC CLOUDS

TECHNICAL FIELD

The present disclosure relates generally to cloud storage.

BACKGROUND

A content delivery network or content distribution network (CDN) is a globally distributed network of proxy servers deployed in multiple data centers. The goal of a CDN is to serve content to end-users with high availability and high performance. CDNs serve a large fraction of the Internet content today, including web objects (text, graphics and scripts), downloadable objects (media files, software, documents), applications (e-commerce, portals), live streaming media, on-demand streaming media, and social networks.

Content providers such as media companies and e-commerce vendors pay CDN operators to deliver their content to their audience of end-users. In turn, a CDN pays Internet Service Providers (ISPs), carriers, and network operators for hosting its servers in their data centers. Besides better performance and availability, CDNs also offload the traffic served directly from the content provider's origin infrastructure, resulting in possible cost savings for the content provider.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
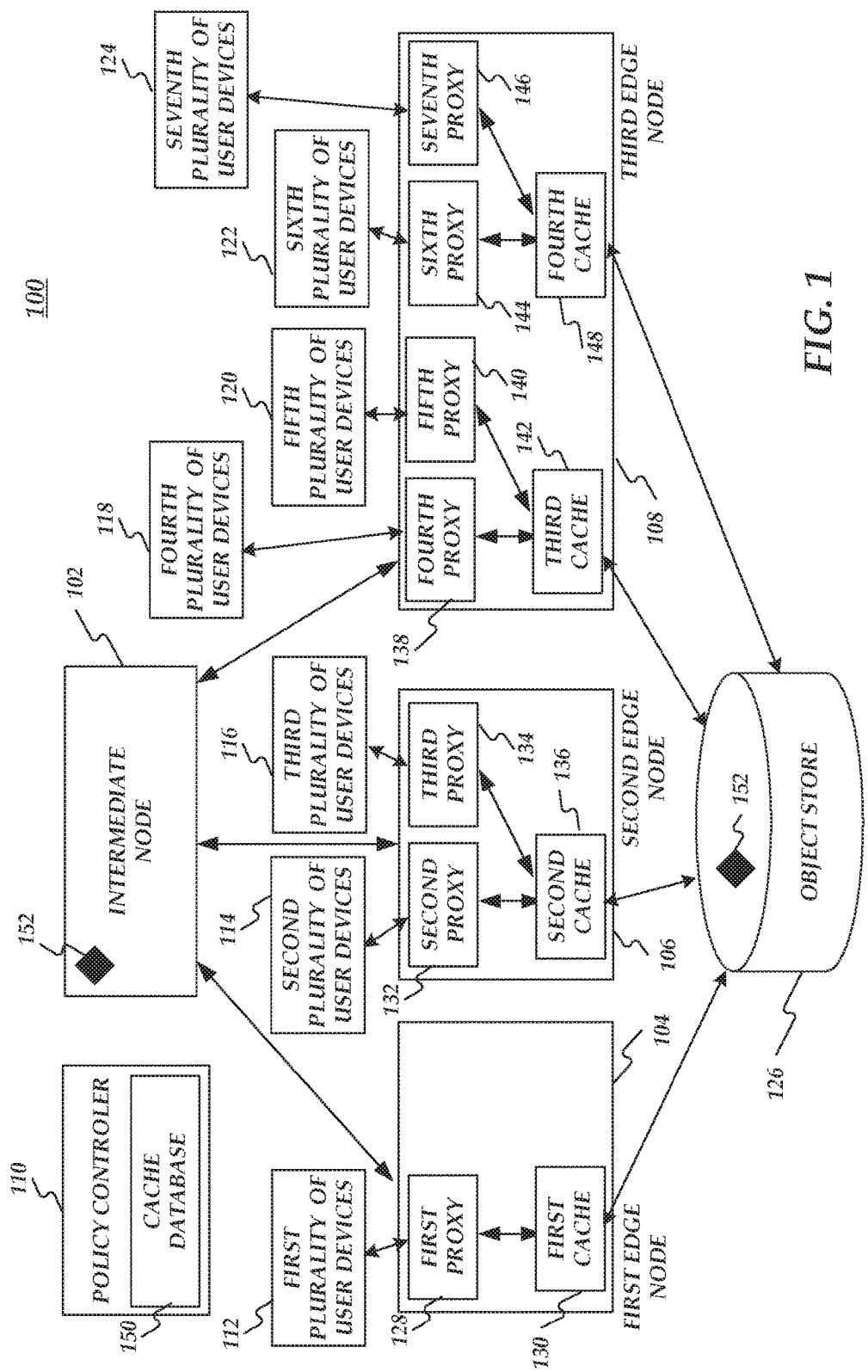
FIG. 1 shows a content delivery network.

Content delivery network storage may be provided. A first proxy module may receive a first content object request from a first user device. The first content object request may correspond to a content object. Next, the first proxy module may send the first content object request to a first cache module. The first cache module may then obtain the content object corresponding to the first content object request from an object store. The object store may be shared by a plurality of cache modules including the first cache module. The first proxy module may then receive, from the first cache module, the obtained content object. The first proxy module may send the content object to the first user device.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Content Delivery Networks (CDNs) may be used to accelerate delivery of web content to client systems. CDNs are a distributed system of caches that hold the most popular content closer to clients to decrease latency and bandwidth costs over network backbones. CDNs may hold any type of static web content (e.g., HTML pages, images, and javscripts) and may be useful for caching video content.

Conventional CDNs have relied on hardware (HW) appliances for caches with stacks of rotational or Solid State Drive (SSD) disks for their storage capacity. Each cache, in conventional systems, functions independently of the others and may be frontend by a load balancer to provide high availability and content-aware redirection. Using a HW appliance may require provisioning for peak load, and dedicating those resources to only the CDN workload.

Embodiments of the disclosure may support a transition from a HW/Bare-Metal CDN to a virtualized CDN. Virtualized caches, consistent with embodiments of the disclosure, may be started and stopped elastically in response to customer demand. Additionally, compute and storage resources may be pooled and shared for better economies of scale.

Moving the CDN from bare-metal cache nodes to the cloud introduces the opportunity for cloud-specific optimizations. For example, edge node caches may have very high input/output (I/O) requirements, serving tens of gigabits per second of traffic, with the data residing both in memory and on physical disks. When moving this workload into the cloud, the following issues must be addressed. First, virtual compute nodes may have minimal "on-instance" storage compared to conventional bare metal caches. Virtual machines (VMs) may be liable to fail more often and be started/stopped more often for demand elasticity. This makes it important to minimize startup costs, which for caches can be significant. Specifically, the cost associated with warming up a cache (pulling in contents from upstream to fill the caches disks) can be expensive. Conventional bare metal caches may have 30-100 TB of disk. Even a VM cache could have several TB of storage that may need to be warmed up for the cache to operate efficiently. Furthermore local storage or block storage on virtual compute nodes may be shared between multiple readers/writers. Some cache applications presume full control over storage for optimization, expecting complete control over a conventional block device. This may lead to resource contention when interacting with a virtual, shared block device. Also, scaling compute, storage, and network capacity independently in a conventional bare metal environment may not be possible, while it may be encouraged in a virtual environment.

Embodiments of the disclosure may separate the proxy and cache (i.e., storage) functions on virtual caches to allow optimizations specific to platforms. A proxy module, for example, may be responsible for the HTTP stack, processing client transactions, and forwarding requests to other servers as needed to fetch content. This is mostly a compute and network I/O intensive workload. The cache module may be responsible for writing content to disk, managing content within the cache, and fetching content as needed by the proxy module. Conventional bare-metal and virtualized caches, however, combine proxy and caching functionality into a single application and a single system. By separating the proxy and cache functions into separate modules, embodiments of the disclosure may: i) scale compute, network, and storage tasks independently; ii) utilize cloud storage primitives (i.e., object store) for cache storage; iii) use the object store as a shared cache; and iv) accelerate cache warm up times with the object store.

By instantiating separate modules for proxying and caching, the CDN may elastically spin-up additional proxy nodes or additional cache nodes as needed to respond to network demand. An example of this is peak live streaming events, such as the Super Bowl. During the Super Bowl, almost all clients are watching the same piece of content and the storage subsystem is barely used. By creating several proxy-only modules, this burst of traffic can be absorbed without consuming unnecessary storage capacity.

Furthermore, separating the proxy function from the cache function may allow multiple storage backends to be "plugged-in" to a cache. These backends may be, for example, spinning disks, large RAM caches, network based block or network based object stores. Conventional HW caches cannot share content between caches because they cannot share their spinning disks. However, with a network based storage platform (e.g., an object store) used by embodiments of the disclosure, caches may share their content. Faster cache-warm ups may be enabled and better economies of scale may be realized through this sharing.

When a conventional edge cache receives a request for content that it does not have on its local disks, the request must be forwarded to another server (e.g., and intermediate node) to retrieve the content. This other server (the parent) is very often much further away than other nearby edge caches. Consistent with embodiments of the disclosure, with an object store that is shared between a group of caches, the number of cache misses to a parent server can be reduced by sharing all content between a set of edge nodes. This may be useful in the cache warm-up case because when a new cache is started for the first time, its cache is completely empty. This may result in a long period of cache misses to the parent as the cache warms up. With a shared object store as a storage backend with embodiments of the disclosure, the warm-up process may be eliminated by giving the new cache immediate access to the shared content of the rest of the edge nodes.

Conventional HW caches are individually responsible for managing their caching and eviction policies. By introducing a shared object store with embodiments of the disclosure, a resource may be cooperatively managed to ensure responsible use of space and bandwidth. Accordingly, embodiments of the disclosure may provide a policy controller to make decisions about what should be written into the object store and what should be evicted from the object store. The policy controller may implement a shared cache database that may maintain a record of all objects in the object store and their relative popularities over time. Each cache module may contribute to shared popularity metrics to help calculate which pieces of content it is most worthwhile to bring into the object store.

FIG. 1 shows a content delivery network 100 consistent with embodiments of the disclosure for providing content delivery network storage. As shown in FIG. 1, content delivery network 100 may comprise an intermediate node 102, a first edge node 104, a second edge node 106, a third edge node 108, and a policy controller 110. A first plurality of user devices 112 may be served by first edge node 104. A second plurality of user devices 114 and a third plurality of user devices 116 may be server by second edge node 106. A fourth plurality of user devices 118, a fifth plurality of user devices 120, a sixth plurality of user devices 122, and a seventh plurality of user devices 124 may be server by third edge node 108. Content delivery network 100 may further include an object store 126.

First edge node 104 may comprise a first proxy module 128 and a first cache module 130. First proxy module 128 may communicate with and utilize first cache module 130. Second edge node 106 may comprise a second proxy module 132, a third proxy module 134, and a second cache module 136. Second proxy module 132 and third proxy module 134 may communicate with and utilize second cache module 136. Third edge node 108 may comprise a fourth proxy module 138, a fifth proxy module 140, a third cache module 142, a sixth proxy module 144, a seventh proxy module 146, and a fourth cache module 148. Fourth proxy module 138 and fifth proxy module 140 may communicate with and utilize third cache module 142. Sixth proxy module 144 and seventh proxy module 146 may communicate with and utilize fourth cache module 148. Policy Controller 110 may include a cache database 150. Object store 126 and intermediate node 102 may include a content object 152.

Any of the user devices (e.g., in first plurality of user devices 112, second plurality of user devices 114, third plurality of user devices 116, fourth plurality of user devices 118, fifth plurality of user devices 120, sixth plurality of user devices 122, and seventh plurality of user devices 124) may comprise a communication terminal that may comprise, but is not limited to, a set-top box (STB), a digital video recorder, a cable modem, a personal computer, a Wi-Fi access point, a cellular base station, a switch servicing multiple clients in a vicinity, a tablet device, a mobile device, a smart phone, a telephone, a remote control device, a network computer, a mainframe, a router, or other similar device. Intermediate node 102, first edge node 104, second edge node 106, and third edge node 108 may comprise, but are not limited to, a server, a router, a switch, or other similar network devices. First proxy module 128, second proxy module 132, third proxy module 134, fourth proxy module 138, fifth proxy module 140, sixth proxy module 144, and seventh proxy module 146 may comprise software modules that may be instantiated or uninstantiated on their respective edge routers based, for example, on the load on content delivery network 100. Similarly, first cache model 130, second cache model 136, third cache model 142, and fourth cache model 148 may comprise software modules that may be instantiated or uninstantiated on their respective edge routers based, for example, on the load on content delivery network 100.

As stated above, embodiments of the disclosure may separate the proxy and cache (i.e., storage) functions on virtual caches to allow optimizations specific to platforms. Proxy modules (e.g., first proxy module 128, second proxy module 132, third proxy module 134, fourth proxy module 138, fifth proxy module 140, sixth proxy module 144, and seventh proxy module 146) may be responsible for their respective HTTP stacks, processing client transactions from their respective connected user devices, and forwarding requests to other servers (e.g., intermediate node 152) as needed to fetch content. The cache modules (e.g., first cache model 130, second cache model 136, third cache model 142, and fourth cache model 148) may be responsible for writing content to disk (e.g., object store 126), managing content within the cache (e.g., object store 126), and fetching content from object store 126 as needed by their respective proxy modules.

By instantiating separate modules for proxying and caching, content delivery network 100 may elastically spin-up additional proxy modules or additional cache modules as needed to respond to network demand on content delivery network 100. For example, first edge node 104 may service first plurality of user devices 112. The number of user devices in this group may be small enough to be served by one proxy module (i.e., first proxy module 128). Second edge node 106, however, may serve more user devices than first edge node 104. For example, the network demand may have increased on second edge node 106 to the point where two proxy modules (i.e., second proxy module 132 and third proxy module 134) may be needed to service the demand caused by the user devices comprising second plurality of user devices 114 and third plurality of user devices 116. Second cache module 136 may be sufficient to serve two proxy modules (i.e., second proxy module 132 and third proxy module 134).

Continuing this example, the network demand on content delivery network 100 may have increased on third edge node 108 to the point where more than two proxy modules (i.e., fourth proxy module 138, fifth proxy module 140, sixth proxy module 1144, and seventh proxy module 146) may be needed to service the demand caused by the user devices comprising fourth plurality of user devices 118, fifth plurality of user devices 120, sixth plurality of user devices 122, and seventh plurality of user devices 124. Accordingly, content delivery network 100 may elastically spin-up additional proxy modules or additional cache modules as needed to respond to network demand. By creating multiple proxy-only modules, this burst of traffic can be absorbed without consuming unnecessary storage capacity. In the above example, cache modules may server a number of proxy modules and are not limited to serving two.

Figure 2:
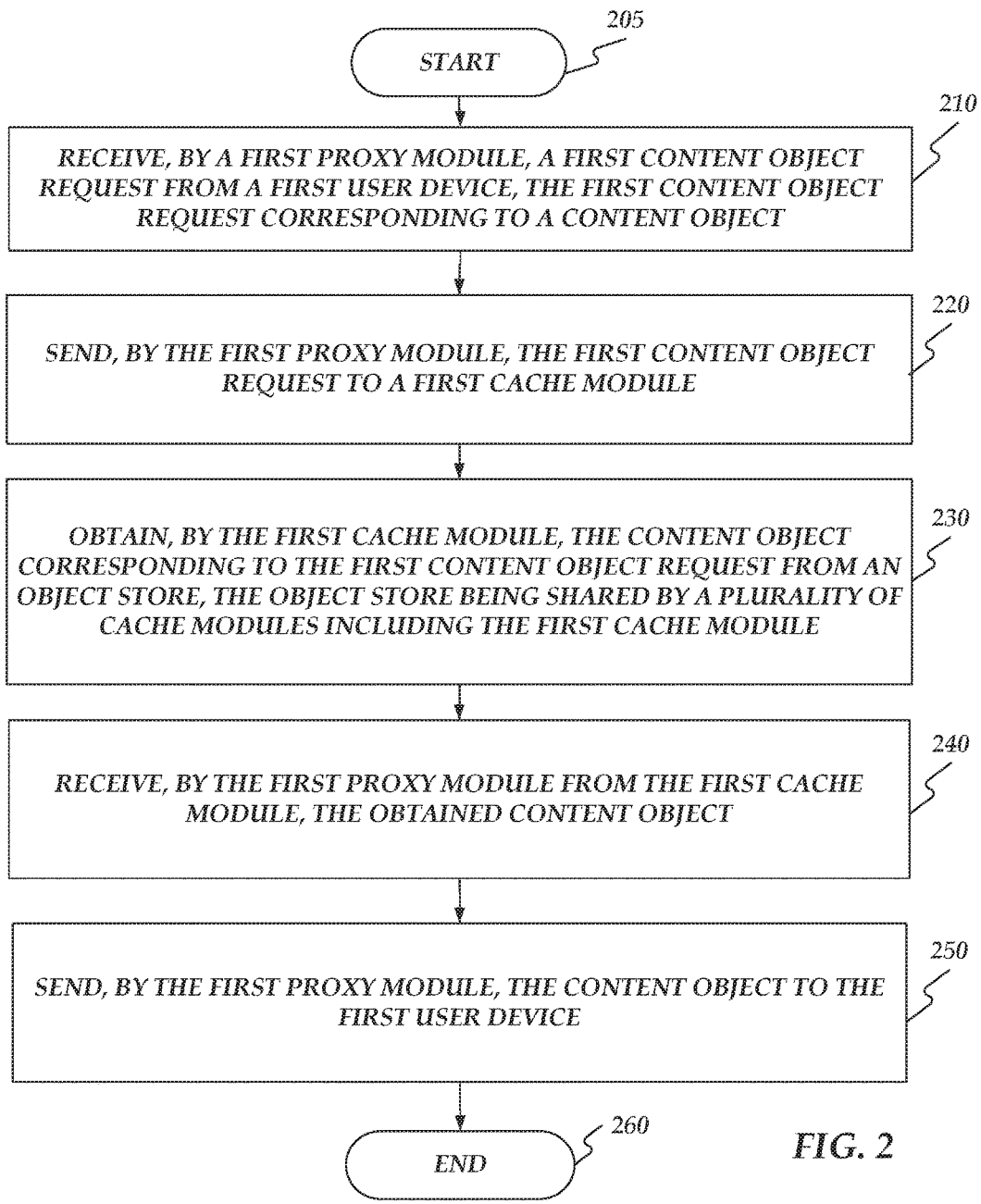
FIG. 2 is a flow chart of a method for providing content delivery network storage.

FIG. 2 is a flow chart setting forth the general stages involved in a method 200 consistent with an embodiment of the invention for providing content delivery network storage. Method 200 may be implemented using content delivery network 100 as described in more detail above with respect to FIG. 1. Ways to implement the stages of method 200 will be described in greater detail below.

Method 200 may begin at starting block 205 and proceed to stage 210 where first proxy module 128 may receive a first content object request from a first user device. The first user device may be in the first plurality of user devices 112. The first content object request may correspond to content object 152. For example, content object 152 may comprise video content to be displayed on the first user device. First proxy module 128 may be responsible for the HTTP stack, processing client transactions, and forwarding requests to other servers as needed to fetch content.

From stage 210, where first proxy module 128 receives the first content object request, method 200 may advance to stage 220 where first proxy module 128 may send the first content object request to first cache module 130. For example, first cache module 130 may be responsible for writing content to object store 126, managing content within the cache, and fetching content as needed by first proxy module 128.

Once first proxy module 128 sends the first content object request to first cache module 130 in stage 220, method 200 may continue to stage 230 where first cache module 130 may obtain content object 152 corresponding to the first content object request from object store 126. Object store 126 may be shared by a plurality of cache modules including first cache module 130. For example, object store 126 may be shared between first cache model 130, second cache model 136, third cache model 142, and fourth cache model 148.

Embodiments of the disclosure may provide policy controller 110 to make decisions about what should be written into object store 126 and what should be evicted from object store 126. Policy controller 110 may implement shared cache database 150 that may maintain a record of all objects in object store 126 and their relative popularities over time. Each cache module may contribute to shared popularity metrics to help calculate which pieces of content is most worthwhile to bring into object store 126. When obtaining content object 152 corresponding to the first content object request from object store 126, first cache module 130 may querying cache database 150 on policy controller 110 to determine that the content object is on object store 126.

After first cache module 130 obtains content object 152 corresponding to the first content object request from object store 126 in stage 230, method 200 may proceed to stage 240 where first proxy module 128 may receive from first cache module 130, obtained content object 152. From stage 240, where first proxy module 128 receives obtained content object 152, method 200 may advance to stage 250 where first proxy module 128 may send content object 152 to the first user device. For example, content object 152 may comprise video content that the first user device may display. Once first proxy module 128 sends content object 152 to the first user device in stage 250, method 200 may then end at stage 260.

Because object store 126 may be shared between first cache model 130, second cache model 136, third cache model 142, and fourth cache model 148 and because policy controller 110 may implement shared cache database 150 that may maintain a record of all objects in object store 126, any user device (e.g., in first plurality of user devices 112, second plurality of user devices 114, third plurality of user devices 116, fourth plurality of user devices 118, fifth plurality of user devices 120, sixth plurality of user devices 122, and seventh plurality of user devices 124) in content delivery network 100 may obtain content object 152 from object store 126. For example, second proxy module 132 may receive a second content object request from a second user device where the second content object request corresponding to content object 152. Second proxy module 132 may send the second content object request to second cache module 136. Second cache module 136 may obtain content object 152 corresponding to the second content object request from object store 126. Second proxy module 132 may receive the obtained content object 152 from second cache module 136 and send content object 152 to the second user device. When obtaining content object 152, second cache module 136 may query cache database 150 on policy controller 110 to determine that content object 152 is on object store 126.

Figure 3:
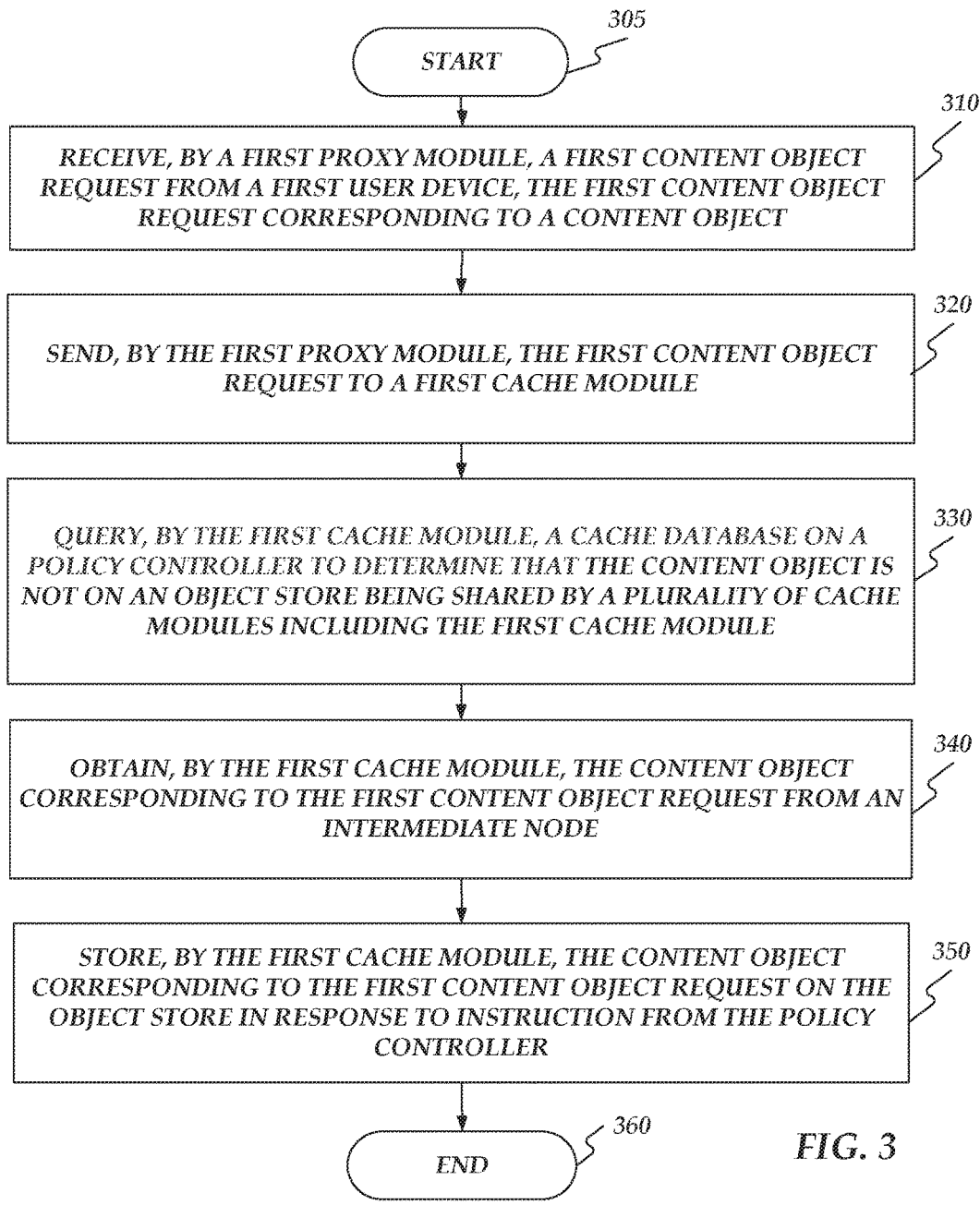
FIG. 3 is a flow chart of a method for providing content delivery network storage.

FIG. 3 is a flow chart setting forth the general stages involved in a method 300 consistent with an embodiment of the invention for providing content delivery network storage. Method 300 may be implemented using content delivery network 100 as described in more detail above with respect to FIG. 1. Ways to implement the stages of method 300 will be described in greater detail below.

Method 300 may begin at starting block 305 and proceed to stage 310 where first proxy module 128 may receive a first content object request from a first user device. The first content object request may correspond to content object 152. For example, content object 152 may comprise video content to be displayed on the first user device. First proxy module 128 may be responsible for the HTTP stack, processing client transactions, and forwarding requests to other servers as needed to fetch content.

From stage 310, where first proxy module 128 receives the first content object request from the first user device, method 300 may advance to stage 320 where first proxy module 128 may send the first content object request to first cache module 130. For example, first cache module 130 may be responsible for writing content to object store 126, managing content within the cache, and fetching content as needed by first proxy module 128.

Once first proxy module 128 sends the first content object request to first cache module 130 in stage 320, method 300 may continue to stage 330 where first cache module 130 may query cache database 150 on policy controller 110 to determine that content object 152 is not on object store 126 shared by a plurality of cache modules including first cache module 130. For example, when attempting to obtain content object 152 corresponding to the first content object request from object store 126, first cache module 130 may querying cache database 150 on policy controller 110 to determine that the content object is not on object store 126. In this example, the query of cache database 150 may indicate that content object 152 is not on object store 126 shared by a plurality of cache modules including first cache module 130.

After first cache module 130 determines that content object 152 is not on object store 126 in stage 330, method 300 may proceed to stage 340 where first cache module 130 may obtain content object 152 corresponding to the first content object request from intermediate node 152. For example, when it is determined that content object 152 is not on object store 126, the request may be forwarded to another server (e.g., and intermediate node) to retrieve the content. However, this other server (e.g., the parent) may be further away from first edge node 104 than object store 126.

From stage 340, where first cache module 130 obtains content object 152 corresponding to the first content object request from intermediate node 152, method 300 may advance to stage 350 where first cache module 130 may store content object 152 corresponding to the first content object request on object store 126 in response to instruction from policy controller 110. For example, embodiments of the disclosure may provide policy controller 110 to make decisions about what should be written into the object store and what should be evicted from the object store. Policy controller 110 may implement shared cache database 150 that may maintain a record of all objects in object store 126 and their relative popularities over time. Each cache module may contribute to shared popularity metrics to help calculate which pieces of content it is most worthwhile to bring into object store 126.

When deciding what should be written into object store 126 and what should be evicted from object store 126, policy controller 110 may consider the following policies. For example, embodiments of the disclosure may give explicit prioritization via a URL regular expression. Policy controller 110 may consider popularity above a predetermined threshold (e.g., cache all 15% of the most popular content.)

Moreover, policy controller 110 may target the cache size. For example, policy controller 110 may target the cache size to consume no more than a predetermined amount (e.g., 5 TB) of object store 126. When exceeding the predetermined amount, policy controller 110 may evict content from object store 126 based on Least Recently Used (LRU) or popularity metrics, for example. This could also be implemented as a given cost of object store resources. For example, policy controller 110 may target the cache size to consume no more than a predetermined cost (e.g., $1,000) of object store resources per month, which can translate to a given maximum size. Moreover, costs may be shifted around per day based on predictive load metrics.

Moreover, policy controller 110 may target a cache hit rate, for example, based on percent hit rate or cache miss bandwidth. In this example, policy controller 110 may cache the most popular content until the cache hit rate reaches a predetermined level. This may also function as placing a maximum bound on the bandwidth required to the parent tier of caches. Once first cache module 130 stores content object 152 on object store 126 in stage 350, method 300 may then end at stage 360.

Figure 4:
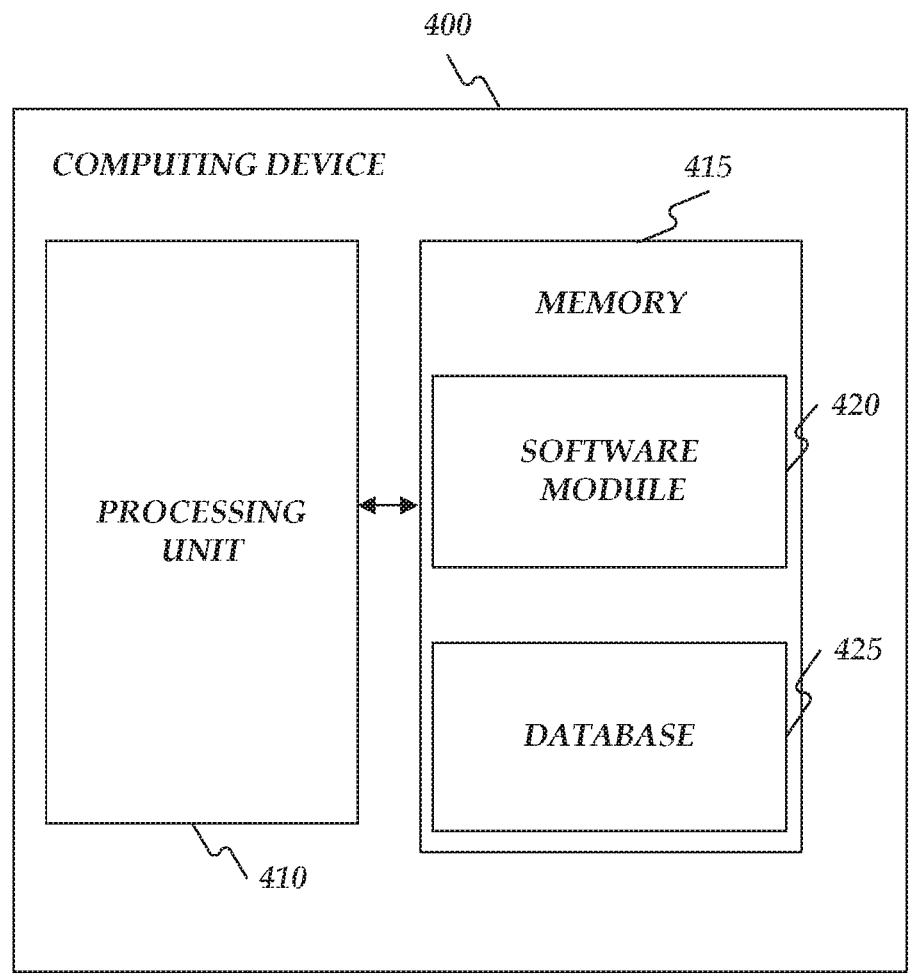
FIG. 4 shows a computing device.

FIG. 4 shows a computing device 400. As shown in FIG. 4, computing device 400 may include a processing unit 410 and a memory unit 415. Memory unit 415 may include a software module 420 and a database 425. While executing on processing unit 410, software module 420 may perform processes for providing content delivery network storage, including for example, any one or more of the stages from method 200 described above with respect to FIG. 2 and any one or more of the stages from method 300 described above with respect to FIG. 3. Computing device 400, for example, may provide an operating environment for any one or more of the devices in content delivery network 100 including, but not limited to, intermediate node 102, first edge node 104, second edge node 106, third edge node 108, policy controller 110, first plurality of user devices 112, second plurality of user devices 114, third plurality of user devices 116, fourth plurality of user devices 118, fifth plurality of user devices 120, sixth plurality of user devices 122, seventh plurality of user devices 124, and object store 126.

Computing device 400 may be implemented using a Wi-Fi access point, a cloud-based server, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    receiving, by a first proxy module, a first content object request from a first user device, the first content object request corresponding to a content object;
    sending, by the first proxy module, the first content object request to a first cache module;
    obtaining, by the first cache module, the content object corresponding to the first content object request from an object store, the object store being shared by a plurality of cache modules including the first cache module;
    receiving, by the first proxy module from the first cache module, the obtained content object;
    sending, by the first proxy module, the content object to the first user device;
    receiving, by a second proxy module, a second content object request from a second user device, the second content object request corresponding to the content object:
    sending, by the second proxy module, the second content object request to a second cache module wherein the first proxy module and the first cache module reside on a first edge node and the second proxy module and the second cache module reside on a second edge node;
    obtaining, by the second cache module, the content object corresponding to the second content object request from the object store, the object store being shared by the plurality of cache modules including the second cache module;
    receiving, by the second proxy module from the second cache module, the obtained content object; and
    sending, by the second proxy module, the content object to the second user device.

2. The method of claim 1, wherein obtaining, by the first cache module, the content object corresponding to the first content object request from the object store comprise querying, by the first cache module, a cache database on a policy controller to determine that the content object is on the object store.

3. The method of claim 1, wherein obtaining, by the second cache module, the content object corresponding to the second content object request from the object store comprise querying, by the second cache module, a cache database on a policy controller to determine that the content object is on the object store.

4. A method comprising:
    receiving, by a first proxy module, a first content object request from a first user device, the first content object request corresponding to a content object;
    sending, by the first proxy module, the first content object request to a first cache module;
    querying, by the first cache module, a cache database on a policy controller to determine that the content object is not on an object store being shared by a plurality of cache modules including the first cache module;

obtaining, by the first cache module, the content object corresponding to the first content object request from an intermediate node;

storing, by the first cache module, the content object corresponding to the first content object request on the object store in response to instruction from the policy controller;

receiving, by the first proxy module from the first cache module, the obtained content object; and sending, by the first proxy module, the content object to the first user device.

5. The method of claim 4, further comprising updating, by the first cache module, the cache database on the policy controller with information indicating that the content object is on the object store.

6. The method of claim 4, wherein receiving the obtained content object comprises receiving the obtained content object wherein the first proxy module and the first cache module reside on a first edge node.

7. The method of claim 4, further comprising:

receiving, by a second proxy module, a second content object request from a second user device, the second content object request corresponding to the content object;

sending, by the second proxy module, the second content object request to a second cache module;

obtaining, by the second cache module, the content object corresponding to the second content object request from the object store, the object store being shared by the plurality of cache modules including the second cache module;

receiving, by the second proxy module from the second cache module, the obtained content object; and sending, by the second proxy module, the content object to the second user device.

8. The method of claim 7, wherein obtaining, by the second cache module, the content object corresponding to the second content object request from the object store comprise querying, by the second cache module, the cache database on the policy controller to determine that the content object is on the object store.

9. The method of claim 7, wherein receiving the obtained content object, by the second proxy module from the second cache module, comprises receiving the obtained content object, by the second proxy module from the second cache module, wherein the second proxy module and the second cache module reside on a same edge node.

10. The method of claim 7, wherein receiving the obtained content object, by the first proxy module from the first cache module, comprises receiving the obtained content object, by the first proxy module from the first cache module, wherein the first proxy module and the first cache module reside on a first edge node and wherein receiving the obtained content object, by the second proxy module from the second cache module, comprises receiving the obtained content object, by the second proxy module from the second cache module, wherein the second proxy module and the second cache module reside on a second edge node.

11. The method of claim 7, wherein receiving the obtained content object, by the first proxy module from the first cache module, comprises receiving the obtained content object, by the first proxy module from the first cache module, wherein the first proxy module, the first cache module, the second proxy module, and the second cache module reside on the same edge node.

12. An apparatus comprising:

a memory storage; and a processing unit coupled to the memory storage, wherein the processing unit is operative to:

receive, by a first proxy module, a first content object request from a first user device, the first content object request corresponding to a content object;

send, by the first proxy module, the first content object request to a first cache module;

query, by the first cache module, a cache database on a policy controller to determine that the content object is not on an object store being shared by a plurality of cache modules including the first cache module;

obtain, by the first cache module, the content object corresponding to the first content object request from an intermediate node;

store, by the first cache module, the content object corresponding to the first content object request on in the object store in response to instruction from the policy controller;

receive, by the first proxy module from the first cache module, the obtained content object; and send, by the first proxy module, the content object to the first user device.

13. The apparatus of claim 12, wherein the processing unit is further operative to update, by the first cache module, the cache database on the policy controller with information indicating that the content object is on the object store.

* * * * *